Feb. 11, 1936.  A. HAUCKE ET AL  2,030,450
ELECTRIC GASEOUS DISCHARGE DEVICE
Filed Aug. 20, 1935
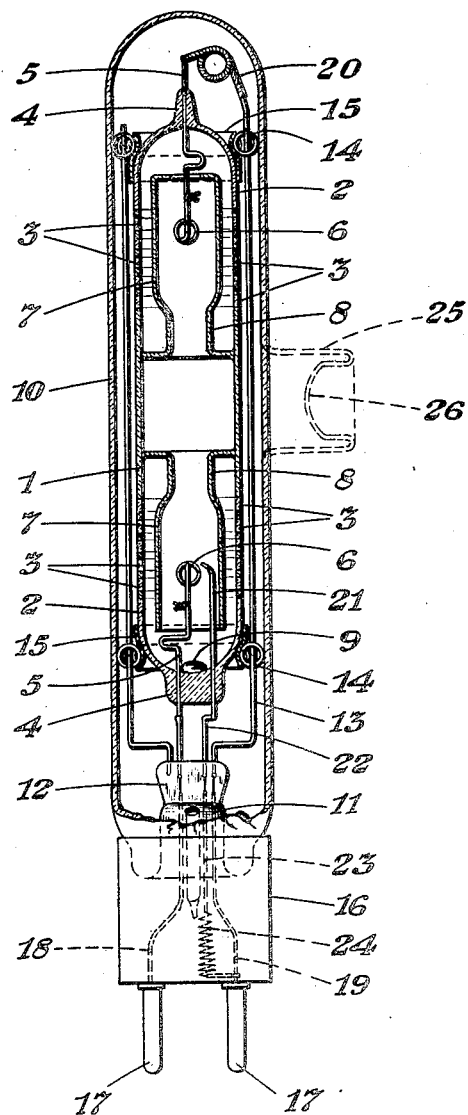
INVENTORS
Artur Haucke
Hermann Krefft
BY Harry E. Dunham
ATTORNEY Patented Feb. 11, 1936

2,030,450

UNITED STATES PATENT OFFICE 2,030,450

ELECTRIC GASEOUS DISCHARGE DEVICE

Artur Haucke, Berlin, and Hermann Krefft, Berlin-Friedrichshagen, Germany, assignors to General Electric Company, a corporation of New York Application August 20, 1935, Serial No. 37,058
In Germany September 11, 1934

3 Claims. (Cl. 250—35)

The present invention relates to electric gaseous discharge devices in general, and in particular to those devices which operate at an extremely high temperature.

A particular object of the invention is to provide a novel discharge device having an envelope of fused silica or the like. A further object of the invention is to provide means to protect the graded seal in such a structure from the discharge therein. Another object of the invention is to decrease the rate of blackening of the envelope of such a device. Still other objects and advantages of the invention will appear from the following detailed specification or from an inspection of the accompanying drawing.

The invention consists in the new and novel structure and combination of parts which is hereinafter set forth and claimed.

When fused silica or the like is used for the envelope of electric gaseous discharge devices, such as the recently developed high intensity metal vapor arc lamps it is necessary to use a graded seal between the fused silica and the in-leads, only the central portion of the lamp envelope thus consisting of the fused silica. With this construction it has been found that the graded seals are soon destroyed due to their exposure to the heat from the highly constricted arc in these devices. We have now discovered that this difficulty is entirely eliminated by arranging two fused silica tubes co-axially within the outer tube in such fashion that they enclose the thermionic cathodes. The sensitive sealing points of the transition glass rings are thereby protected effectively from the direct heat radiation of the electrodes and of the discharge column which lead to an irregular temperature stress. It is an advantage to contract slightly these protective quartz tubes at the ends which face each other and, further, to seal them to the inside wall of the quartz tube which forms the center part of the discharge tube, so that they form one unit with the latter. The internal structure of the high-pressure discharge tubes is thereby simplified considerably. At the same time, volatilized electrode particles are intercepted by the inserted quartz protection tubes, so that they cannot be deposited on the center part of the tube which is to be considered mainly for the light emission.

The tube can, in the known manner, be enclosed by an evacuated protection bulb of hard glass. The latter is given various shapes, depending on the purpose for which the tube is to be used, and in certain cases consists of a smooth cylindrical tube. In case the creation of a smooth luminous surface with high light intensity or ultra-violet-ray intensity is desired we also provide on the center part of the evacuated protection tube a tubular connection which protrudes to the outside and which is closed off by a thin-walled window of a glass which is highly transparent to ultra-violet rays.

A physical embodiment of a high-pressure discharge tube designed according to this invention is shown in cross section in the accompanying drawing.

The discharge tube consists of a quartz or fused silica tube 1, which forms the center part, two end parts 2, consisting of hard glass, and a number of transition rings 3, which form the connection between the quartz tube 1 and the end parts 2 and which have for this purpose correspondingly graduated coefficients of expansion. Glass parts 4 project from the ends 2, and in each of them a current-supply wire 5 is sealed hermetically. At the inside ends of these current-supply wires 5 the two thermionic electrodes 6 are fastened. The latter can be designed in any desired manner and may consist for instance of coiled tungsten wire with inserted rods of materials which emit electrons such as earth-alkali metal oxides. The two electrodes are surrounded by quartz tubes 7 which are arranged co-axially within a tube, and whose ends 8, which face each other, are contracted, and in addition are sealed to the inside wall of the quartz tube 1. The inserted quartz tubes 7 therefore constitute one unit with the quartz tube 1. The tube contains in the known manner a basic filling of rare gas and in addition a vaporizable body 9 such as mercury, cadmium, zinc, thallium, bismuth, or mixtures of these metals in suitable quantity. During the operation of the tube, a discharge column is developed between the two electrodes which is led through the inserted quartz tube 7, 8. The discharge tube is enclosed by an evacuated protection tube 10 of hard glass which at the lower end is sealed to a stem tube 11. In the stem mark 12 of the stem tube a wire structure 13 is fastened, which surrounds the inside tube and therefore the actual discharge tube; on this wire structure two coiled wire rings 14, which serve for the supporting of the inside tube by the protection tube 10, are provided by means of supporting rings 15. At the lower end of the protection tube 10 a base 16 is fastened which has protruding base pins 17. One of these base pins is electrically connected by means of the wire 18 to the current supply 5 of the lower electrode 6, while the other pin 17 is electrically connected with the structure 13 by means of a conductor 19, which structure 13 in turn establishes the connection to the current supply 5 for the upper electrode 6 by means of a wire 20. Within the discharge tube there is finally arranged an auxiliary electrode 21 close to the lower electrode 6. The current supply 22 of this auxiliary electrode is connected over a conductor 23 and through a high resistance 24 to the supply wire 19 for the upper glow electrode 6, so that this auxiliary electrode always has the same potential as the upper glow electrode.

The protective vessel 10 is ordinarily completely cylindrical over its entire length. However, in case it is desired it is provided, as indicated by dotted lines, with a tubular connection 25 which protrudes to the outside and which is closed off by the thin-walled window 26 of fused silica or of a glass with a high transparency to ultraviolet light.

The thermionic electrodes illustrated are of the self-heating type, but it is obvious that where desired other types can be substituted therefor, and that in certain cases these electrodes are heated independently of the discharge.

While we have illustrated our invention by reference to a specific embodiment thereof it is to be understood that various changes, omissions and substitutions, within the scope of the appended claims, can be made therein without departing from the spirit of my invention.

What we claim as new and desire to secure by Letters Patent of the United States, is:—

1. An electric gaseous discharge device comprising a sealed tubular envelope having a central portion of fused silica with ends of glass sealed thereto through a graded seal, a gaseous atmosphere within said envelope, inleads sealed through said glass ends and supporting electrodes within said envelope, and a pair of coaxial tubes of fused silica fused to the inner wall of said envelope near opposite ends of the fused silica portion thereof and extending therefrom past said graded seals to a point beyond said electrodes whereby said seals are protected from the discharge.

2. An electric gaseous discharge device comprising a sealed tubular envelope having a central portion of fused silica with ends of glass sealed thereto through a graded seal, a gaseous atmosphere within said envelope, inleads sealed through said glass ends and supporting electrodes within said envelope, and a pair of coaxial tubes of fused silica fused to the inner wall of said envelope near opposite ends of the fused silica portion thereof and extending therefrom past said graded seals to a point beyond said electrodes whereby said seals are protected from the discharge, said tubes being reduced in area near the point where they are fused to said envelope.

3. An electric gaseous discharge device comprising a sealed tubular envelope having a central portion of fused silica with ends of glass sealed thereto through a graded seal, a gaseous atmosphere within said envelope, inleads sealed through said glass ends and supporting electrodes within said envelope, a pair of coaxial tubes of fused silica fused to the inner wall of said envelope near opposite ends of the fused silica portion thereof and extending therefrom past said graded seals to a point beyond said electrodes whereby said seals are protected from the discharge, and an enclosing jacket for said envelope, said jacket having a thin-walled window opposite the fused silica portion of said envelope, said window consisting of a material which is highly transparent to ultraviolet light.

ARTUR HAUCKE.
HERMANN KREFFT.